United States Patent [19]

Brunet et al.

[11] Patent Number: 5,201,917
[45] Date of Patent: Apr. 13, 1993

[54] PLATE WITH AN ABRASION-PROOF SURFACE AND PROCESS FOR THE PRODUCTION THEREOF

[75] Inventors: Pierre Brunet, Saint Pierre D'Albigny; Guy Maybon, Saint Jorioz, both of France

[73] Assignee: Technogenia S.A., Saint Jorioz, France

[21] Appl. No.: 769,450

[22] Filed: Oct. 1, 1991

[30] Foreign Application Priority Data

Oct. 11, 1990 [FR] France .................. 90 12712

[51] Int. Cl.⁵ .................................. B24D 3/02
[52] U.S. Cl. .......................... 51/309; 51/293; 51/298
[58] Field of Search ............. 53/293; 51/298, 309

[56] References Cited

U.S. PATENT DOCUMENTS

| | | | |
|---|---|---|---|
| 4,423,845 | 1/1984 | Frazier et al. | 241/261.3 |
| 4,425,141 | 1/1984 | Buljan et al. | 51/309 |
| 4,478,611 | 10/1984 | Selden | 51/309 |
| 4,484,644 | 11/1984 | Cook et al. | 51/309 |
| 4,944,774 | 6/1990 | Keshavan et al. | 51/309 |
| 5,051,112 | 9/1991 | Keshavan et al. | 51/298 |

FOREIGN PATENT DOCUMENTS

54636/73 10/1974 Australia .
0227879 8/1987 European Pat. Off. .
2168988 2/1986 United Kingdom .

OTHER PUBLICATIONS

Planseeberichte für Pulvermetallurgie, Bd. 15, 1967, pp. 46–48.
Materials Science and Technology, Jul. 1986, pp. 653–657.

Primary Examiner—Mark L. Bell
Assistant Examiner—Willie J. Thompson
Attorney, Agent, or Firm—William H. Eilberg

[57] ABSTRACT

The present invention relates to the manufacture of abrasion-proof plates. The abrasion-proof surface of the plate is composed of external face 5 of a layer of composite material based on spherical grains of melted tungsten carbide bonded in a soldering alloy. Grinding surface 5 has a smooth and even mould finish. The abrasion-proof layer contains a compact, regular and essentially uniform random distribution of tungsten carbide grains. Surface 5 is made by moulding: the tungsten carbide grains are inserted between the mould walls and core 2 of the part, and the soldering alloy is made to infiltrate between the powder grains, core 2 and the mould by increasing the temperature. The invention allows a significant increase in the abrasion resistance of grinding plates.

8 Claims, 3 Drawing Sheets

PLATE WITH AN ABRASION-PROOF SURFACE AND PROCESS FOR THE PRODUCTION THEREOF

BACKGROUND OF THE INVENTION

1. Field of the Invention

The present invention relates to composite grinding plates which have a contact surface intended to withstand abrasion. Such plates may be used for grinding ceramic powders or for the defibration and refining of paper pulp.

2. Description of the Prior Art

In grinding machines for ceramic powders and defibration or refining machines for paper pulp, such as those described in patents U.S. Application No. 3 117 603 or U.S. Application No. 4 423,845 for example, two plates rotating in relation to each other each bear on an assembly of sectorial plates laid out in a circular ring, the working faces of the plates being equipped with generally radial grooves and being made of an abrasive material, for example alumina, zirconium oxide or silicon carbide.

The working face of the grinding or defibration plate is generally flat. The grooves are the only irregularity on the plate surface, and their shape is carefully chosen to obtain the paper pulp defibration or ceramic powder grinding effect. The material inserted between the plates must be able to flow along the radial grooves, and the shape, spacing and direction of the grooves determine the size of the paper pulp fibres or the ceramic powder grains to be obtained. The plate must thus have very high dimensional and positional accuracy.

Research has shown that grinding machines equipped with plates such as those disclosed in document U.S. Application No. 3 117 603 experience operating disturbances when the plates are made of hard abrasion-proof materials. Disturbances tend to increase with time during machine operation. In particular, a decrease in the grinding efficiency is observed.

Document U.S. Application No. 4 423 845 states that surface irregularities should be deliberately provided, consisting of non-contiguous studs of hard material separated by less hard areas. Uneven wear takes place during plate rotation making the hard studs project, momentarily increasing the grinding efficiency. However, wear continues rapidly, reducing the grinding efficiency.

Other grinding machines are known, for example such as described in documents EP-A-0 227 879, AU-A54 636 or GB-A-2 168 988. The grinding wheels are made of grains of hard material bonded in a polymerized resin. In a grinding machine, the grinding surface is plane or conical with no radial grooves, and consists of small asperities designed to tear out small parts of the material to be ground. These asperities, consisting of grains of hard material, must project above the general surface of the grinding wheel, and the grinding surface is generally regenerated by the gradual tearing out of the asperities and the creation of other asperities due to the fact that the surface has a discontinuous hardness creating preferential resin wear zones, allowing the harder zones forming the asperities to project progressively. The grinding surface thus has an abrasive power.

The invention is a result of the observation according to which abrasive linings used in known grinding or defibration machines have uneven surfaces and are subject to unacceptable wear which is probably due to erosion by cavitation. Consequently, despite the use of hard materials, operating disturbances and reduced grinding efficiency very significantly reduce the life and advantages of such grinding plates.

The present applicant has made very detailed observations of abrasion-proof surfaces made from melted tungsten carbide. Such observations have shown the appearance, in some cases, of relatively fast wear of such surfaces despite the use of particularly hard hardfacing materials apparently capable of withstanding abrasion.

The applicant has observed that abrasion-proof surfaces based on melted tungsten carbide made using known techniques, for example by melting a weld bead, have uniformity defects in the distribution of hard components in the abrasion-proof layer. Such uniformity defects may exist when the abrasion-proof layer is manufactured or may appear during the subsequent use of the surface.

SUMMARY OF THE INVENTION

To avoid these drawbacks, and contrary to the information given in document U.S. Application No. 4 423 845, the present invention proposes a new surface structure capable of avoiding the development of preferential wear zones during the subsequent use of the plate. This new surface structure very significantly improves the abrasion-proof properties of such a surface, to a surprising extent, compared to the properties obtained by known hardfacing techniques by the deposition of material by welding.

According to another aspect, the invention proposes a new abrasion-proof surface structure of this type in which the properties of non-aggressiveness with regard to external agents are considerably increased. In particular, this new structure prevents the formation or subsequent appearance of an abrasive power of the abrasion-proof surface, contrary to the information given in documents EP-A-0 227 879, AU-A-54 636 or GB-A-2 168 988 dealing with abrasive surface grinding wheels.

Another object of the present invention is to propose a new process for making the grinding surface of a grinding plate with the new abrasion-proof structure. An advantage of this process is that such a surface can be manufactured relatively simply and inexpensively without the need for high user skills. Another advantage of this process is that it can be used for the manufacture of any shape of such a surface with very varied profiles including radial grooves and ribs.

The problem is that the grinding surfaces of such grinding plates are shaped so as to have grooves and ribs. In the case of grinders for ceramic materials, the production of such plates is currently achieved using conventional welding techniques and involves extremely expensive manual work.

In the case of plates for producing paper pulp, the dimensional accuracy required precludes the use of conventional welding techniques. Traditional foundry processes are currently used for metal plates but these processes rule out the insertion of solid particles of hard abrasion-proof material into the cast metal: such casting would produce completely unsatisfactory results and, in particular, a very unequal and uncontrollable distribution of grains of abrasion-proof material in the abrasion-proof layer. For composite plates in which a polymerized resin binder is used, moulding techniques can be used. However, the hardness and toughness of the resin are then insufficient to obtain a good abrasion-proof power.

The invention can avoid these difficulties in the manufacture of grinding or defibration plates with an abrasion-proof surface.

An important advantage of the process is that it generally renders subsequent difficult and expensive machining operations unnecessary, and can be used to manufacture parts with a high dimensional accuracy.

In order to achieve these and other objects, the present invention proposes manufacturing a plate for grinding ceramic powders or defibrating and refining paper pulp, the plate comprising a grooved grinding surface made of a hard abrasion-proof material such that:

the grinding surface is composed of the external surface of a layer of composite material based on tungsten carbide powder bonded in a soldering alloy, said external surface has a smooth and even mould finish, said layer contains a regular and essentially uniform random distribution of tungsten carbide powder.

The tungsten carbide powder preferably consists of grains of melted tungsten carbide, the majority of grains having a spheriodal shape.

In the case of plates for grinding ceramic materials or manufacturing bricks, a very significant increase in abrasion resistance has been observed when a significant proportion of the grains has an average diameter of more than 0.5 millimetres. The inventors have observed an increased life of plates of the order of 300% compared to structures with small grain sizes. Tungsten carbide powders in which a substantial proportion of the grains have a diameter of between one and two millimetres can preferably be used.

In practice, the grains belong to two main families with two different grain sizes, namely a first family with a large grain size and a second family with a small grain size. The two families are mixed uniformly in order to give a compact random distribution of tungsten carbide in the layer of hard material.

The tungsten carbide grains have the advantage of a stable chemical composition containing roughly 4% carbon by weight. The stable chemical composition of such a tungsten carbide prevents its dissolution by the soldering alloy when the plate is manufactured. The carbide preferably contains the cubic phase WC $(1-X)$ obtained by fast cooling. The hardness of the tungsten carbide grains is greater than 3000 Vickers.

The process for producing a plate according to the invention involves the following successive stages:

a mould with support walls of the same shape as the abrasion-proof surface to be produced is prepared, particles of melted tungsten carbide are introduced into the mould cavity and the assembly is vibrated so that the surface grains come into as close as possible contact with the walls of the mould and are contiguous with each other, a sufficient quantity of an appropriate alloy in a suitable form is prepared to ensure subsequent distribution of the alloy during the later melting phase; the alloy being a soldering alloy capable of wetting the tungsten carbide grains and melting at a temperature which is less than the melting point of the tungsten carbide and the mould, the assembly is heated to a temperature which exceeds the melting point of the alloy but is less than the melting point of the tungsten carbide and the mould, this temperature is maintained for a sufficient time to ensure infiltration of the molten alloy into the space filled with tungsten carbide grains, the assembly is allowed to cool and the mould is stripped.

This process can be used to produce solid grinding or defibration plates made of abrasion-proof material.

Alternatively, composite grinding or defibration plates can be produced which have a core covered with abrasion-proof material. In this case, before introducing the tungsten carbide particles, at least one metal core is placed inside the cavity of the mould opposite the mould walls. The melting point of the said core must be lower than the temperature to which the assembly will subsequently be heated in order to melt the alloy.

Wall effect considerations make it necessary to adjust the grain size of the tungsten carbide powders so that the space between the wall of the mould and the part to be hardfaced or core has a thickness equal to at least six times the average dimension of the tungsten carbide grains and, in the case of a binary mixture of two sizes, to six times the size of the largest grained particles.

BRIEF DESCRIPTION OF THE DRAWINGS

Further objects, characteristics and advantages of the present invention will be apparent from the following description, reference being made to the accompanying drawings in which.

DESCRIPTION OF THE PREFERRED EMBODIMENTS

Figure 1:
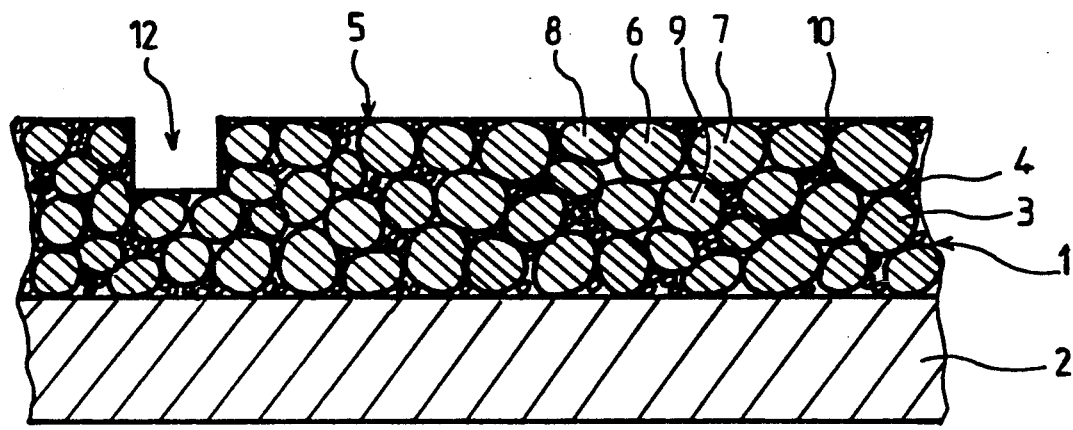
FIG. 1 shows a schematic cross-section of a plate coated with a superficial abrasion-proof layer according to the present invention.

FIG. 1 shows a schematic cross-section of a part coated with a superficial abrasion-proof layer. According to the invention, superficial abrasion-proof layer 1 consists of a layer of composite material based on spheroidal grains of melted tungsten carbide bonded in a nickel-based alloy. Layer 1 is bonded to a metal core 2, core 2 being intended to physically secure the part. In the case, for example, of a plate for a disk grinder used in the ceramics industry or a defibration or refining plate for the manufacture of paper pulp, core 2 consists of a plate-shaped blank which supports abrasion-proof layer 1.

Abrasion-proof layer 1 has a compact random distribution of tungsten carbide grains. In the embodiment shown, the tungsten carbide powder consists of a first grain family 3 made up of spheroidal grains of melted tungsten carbide having a relatively large grain size and a second grain family 4 consisting of spheroidal grains of melted tungsten carbide having a relatively low grain size. The grain size of the first grain family is preferably selected so that the diameter of the grains on average is roughly ten times greater than that of the grains of the second grain family 4. For instance, for the first grain family 3, grains having an average diameter of between 1800 and 2400 microns can be used and, for the second grain family 4, grains having an average diameter of between 100 and 400 microns can be used.

Precautions must be taken to ensure that, in abrasion-proof layer 1, the grains or particles of tungsten carbide are essentially contiguous, mainly in the vicinity of surface 5 which is intended to constitute the abrasion-proof contact surface of the part. For instance, particle 6 essentially contiguous with adjacent particles 7 and 8 and is also contiguous with the particle in lower layer 9. The particles in the outer layer such as particles 6, 7 and 8 are arranged so that they are, as far as possible, tangential to external surface 5 of layer of composite material 1. Said external surface 5, constituting the abrasion-proof contact surface, forms the envelope of the continuous superficial layer of particles such as particles 6, 7 and 8. Particles such as particle 10 of the second grain family 4 occupy the spaces between the grains of the first family 3. The particles of the second grain family 4 are also essentially contiguous with each other and in contact with the grains of the first grain family 3.

The distribution of the particles of tungsten carbide such as particles 6 or particles 10 is preferably even in the layer of composite material to a depth of at least six times the diameter of the particles of the first grain family 3. It is apparent that, in this way, the abrasion-proof properties of the surface are improved, probably because the mechanical stresses between particles are better distributed by a more compact arrangement of grains.

In abrasion-proof layer 1, the particles of the first grain family 3 and the particles of the second grain family 4 are embedded in a metallic matrix. For instance, the metallic matrix may consist of a copper-zinc-nickel-based alloy. Other soldering type alloys can be used provided that they melt at appropriate temperatures and are capable of correctly wetting grains of hard material such as melted spheroidal tungsten carbide. The metallic matrix may also be made of a metal alloy belonging to the group of nickel-based, copper-based or iron-based alloys.

Figure 2:
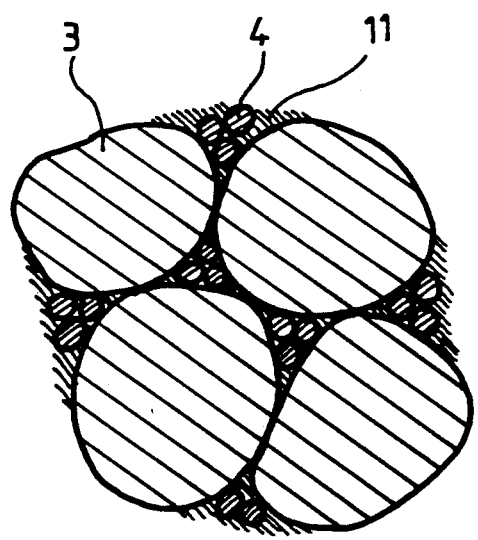
FIG. 2 schematically shows a detail view on an enlarged scale of the superficial abrasion-proof layer in FIG. 1.
Figure 3:
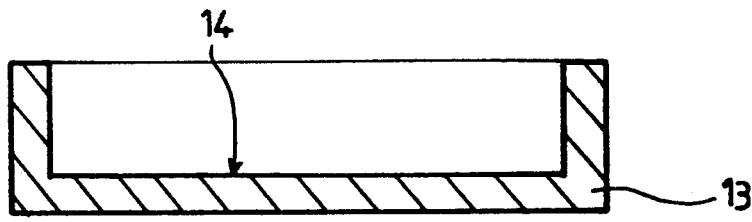
FIGS. 3 to 7 illustrate the various stages of a process for producing an abrasion-proof layer according to the present invention with an embodiment to produce a plate-shaped part.
Figure 4:
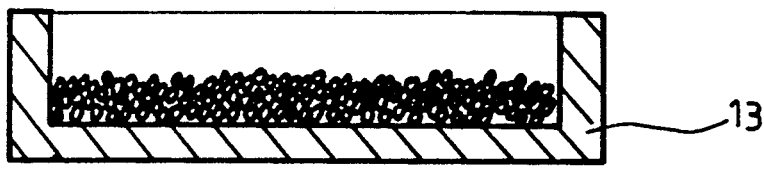
Figure 5:
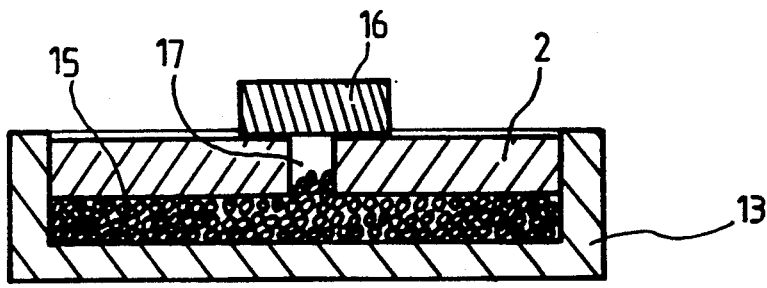
Figure 6:
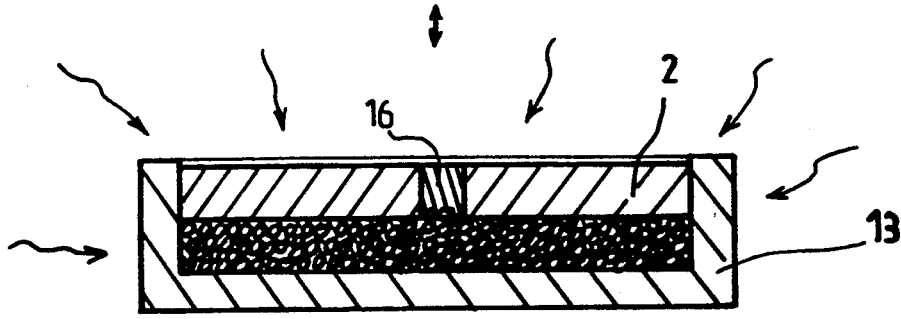

FIG. 2 shows on an enlarged scale the grains of the first powder family 3, the grains of the second powder family 4 and alloy 11 which binds the grains.

As an example, FIG. 1 shows a surface 5 which is essentially flat and has an irregular zone 12, e.g. a groove or cavity. The surface distribution of the powder grains shall be ensured over the entire surface area 5.

The grains of the first powder family 3 and the second powder family 4 are preferably mostly spheroidal particles obtained by melting, dispersing and cooling of droplets of tungsten carbide. Such spheroidal particles of melted tungsten carbide are produced by the present applicant for example and sold under the brand name Spherotene.

Tungsten carbide grains must have a stable chemical composition containing roughly 4% carbon by weight, and contain the cubic phase WC 1−X obtained by fast cooling. Thus, when the plate is manufactured, the outside surface of the carbide grains is not dissolved or altered by alloy 11 which binds the grains. The grain hardness is greater than 3000 Vickers and remains higher than this value in the manufactured plate.

Figure 7:
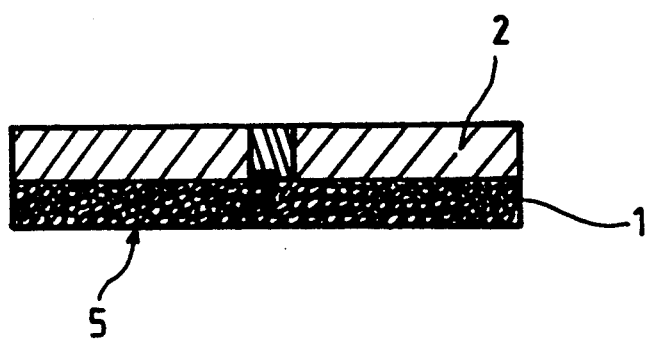

A process for producing an abrasion-proof surface according to the present invention is illustrated in FIGS. 3 to 7. This process, called infiltration, is a kind of special moulding or duplicate moulding on a metal part which forms core 2. In the illustrated embodiment, the process involves the following main stages:

a) a cavity mould 13 is prepared which has mould support walls having the same shape as the abrasion-proof surface to be produced, e.g., the bottom 14 of the mould is shaped the same as the desired shape of the abrasion-proof surface;

b) core 2 is located opposite the support walls of the mould and space 15 between core 2 and mould 13 is filled with spheroidal grains of melted tungsten carbide; in the case of a cavity mould 13 which forms the recipient as shown in the figures, the grains of melted tungsten carbide can initially be placed in the cavity of the mould before core 2 is placed so that it rests on the layer of grains; the entire assembly preferably being vibrated to compact the grains so that the surface grains come into as close as possible contact with wall 14 of the mould and are contiguous with each other;

c) a sufficient quantity of an appropriate alloy 16 is prepared in a suitable solid form by employing means which ensure the subsequent distribution of the alloy during its later melting phase; for example, a block of alloy 16 is placed on core 2 and a channel 17 is provided which passes through the core and through which alloy 16 can flow in order to penetrate space 15 which contains the grains of melted tungsten carbide; the alloy being a soldering alloy capable of wetting the grains of melted tungsten carbide and core 2 and melting at a temperature which is less than the melting point of core 2 and mould 13;

d) this part-mould-alloy assembly is heated by using a suitable method until the soldering alloy melts, infiltrates into the grains of tungsten carbide and welds to metal core 2 which is to be hardfaced: to achieve this, the assembly is heated to a temperature which exceeds the melting point of the alloy but is less than the melting point of core 2 and mould 13;

e) it is allowed to cool and the mould is stripped as shown in FIG. 7. This produces a plate which comprises core 2 and abrasion-proof layer 1.

The same infiltration process can be used without core 2.

In certain cases, a preliminary stage may be carried out to prepare the surface of core 2 in order to allow correct soldering of the soldering joint. This preliminary stage involves carrying out the following operations:

grinding or shot blasting of the surface of core 2, metallisation by applying a film of nickel-chromium-boron-silicon alloy known as "self-fusing" alloy; this metallisation is obtained by using an oxy-acetylene torch fitted with a powder dispenser device or a conventional torch for flame plating with powder.

The powder of spherical grains of melted tungsten carbide which is used to produce the abrasion-proof surface may preferably consist of a previously homogenised mixture of two powder families having different grain sizes, as described in connection with FIGS. 1 and 2.

If there is a requirement to obtain a contact surface 5 which is particularly strong, a subsequent elimination stage involving surface treatment or polishing of surface layer 1 of the abrasion-proof material can be used. Removal of material to a depth of roughly d/2, d being the average diameter of the family of large tungsten carbide grains, essentially eliminates the zone in which grains are disrupted by the wall effect.

The grinding surface according to the invention must have a smooth and even surface condition like the surface condition obtained by moulding.

The applicant has observed that the manufacture of grinding plates with an abrasion-proof surface according to the invention provides a significantly improved efficiency, not only with respect to the abrasion-proof qualities of the plate but also with respect to the efficiency of the grinding itself. A result of the uniform geometry of the ribs is that the particles to be ground normally travel along the passage channels, without being disrupted by irregularities found in plates whose abrasion-proof layer has been manufactured manually by welding, or has been subjected to uneven wear. Another result is that particles to be ground are ground in a single passage between the grinding plates, whereas correct grinding carried out by known techniques normally requires two or more passages.

Figure 8:
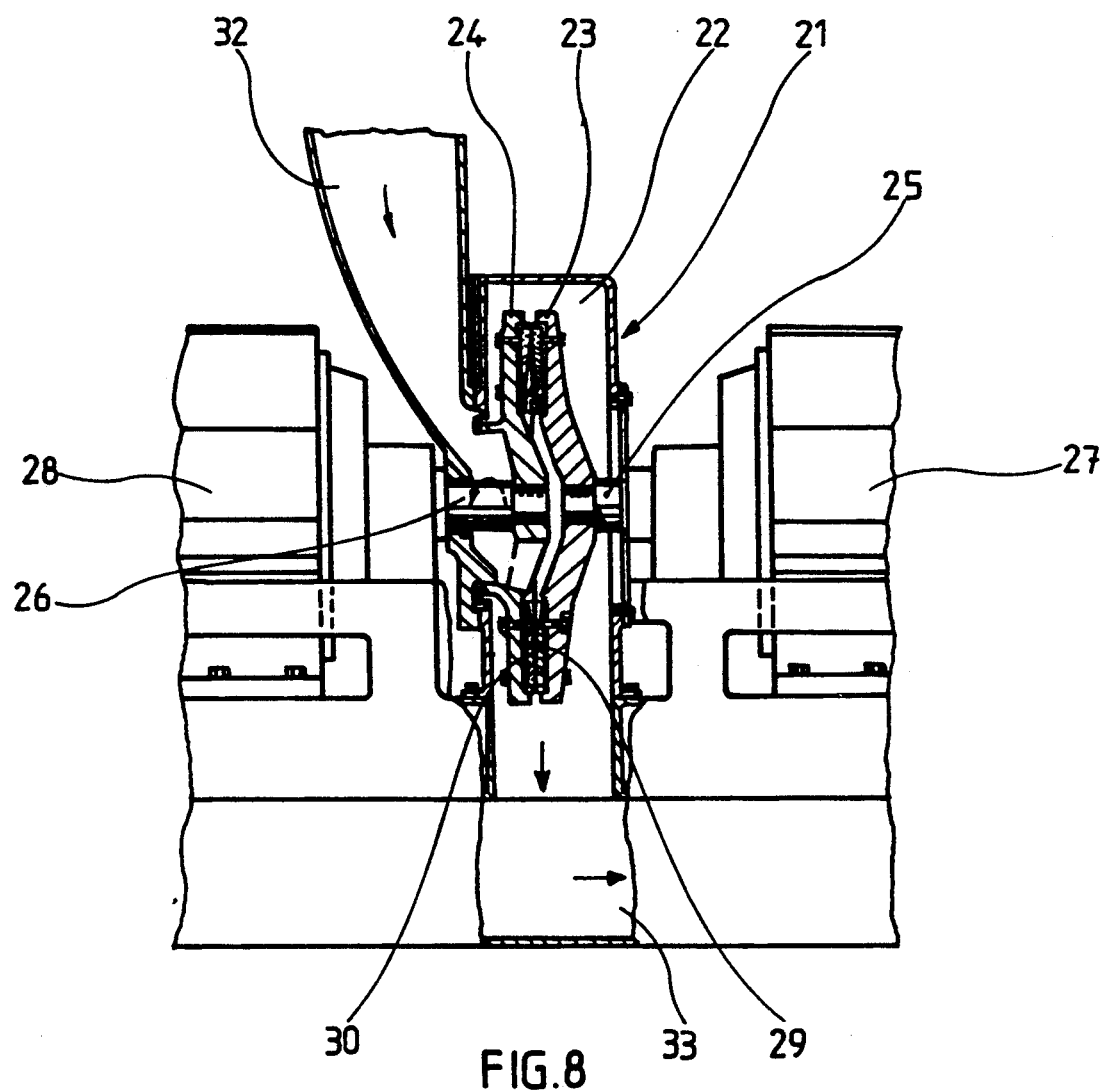
FIG. 8 is a side cross-section illustrating a possible configuration for a grinding machine equipped with grinding plates according to the present invention.

For example, FIG. 8 shows one possible structure of a grinding or a refining machine using abrasion-proof plates according to the invention. The machine consists of a hollow body 21 in which inside space 22 contains two plates 23 and 24 each mounted rotatably on their respective horizontal coaxial shafts 25 and 26. An electric motor 27 rotates shaft 25, and electric motor 28 rotates shaft 26, in opposite directions.

Figure 9:
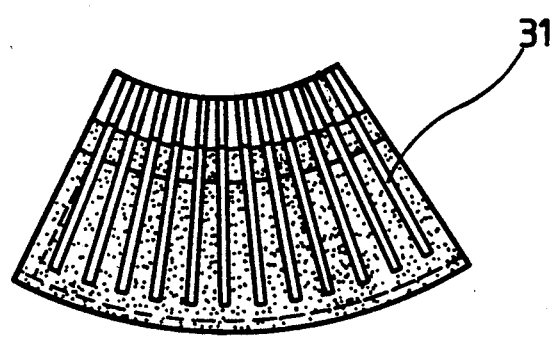
FIG. 9 is a top view showing a sectorial grinding plate according to one embodiment of the invention.

Plates 23 and 24 are placed with a slight gap with respect to each other, and contain two respective surfaces 29 and 30 oriented against each other, in the form of a ring. Surfaces 29 and 30 are formed by offset grinding plates fixed to the body of plate 23 or 24. The grinding plates are made in accordance with the process described hereinabove, and may, for example, have the shape shown in the top view in FIG. 9. These two top views show the abrasion-proof surface of the plate composed of tungsten carbide grains bonded by a metal alloy. Generally radial grooves 31 are distinguished on the abrasion-proof surface.

Operation of the machine in FIG. 8, by rotation of plates 23 and 24, can be used to grind material penetrating in internal space 22 through an inlet duct 32, and leaving after grinding through an outlet duct 33.

The present invention is not limited to the embodiments which are explicitly described and includes various variations and generalisations contained in the scope of the invention as defined in the appended claims below.

We claim:

1. A grinding plate for grinding ceramic powders or for the defibration and refining of paper pulp, comprising a grooved grinding surface formed of a hard abrasion-proof material, wherein:
    the grinding surface is composed of the external surface of a layer of composite material formed of tungsten carbide powder bonded in a soldering alloy,
    said external surface has a smooth and even mold finish,
    said layer contains a regular and essentially uniform compact random distribution of tungsten carbide grains.

2. A plate as claimed in claim 1, wherein the tungsten carbide powder consists of grains of melted tungsten carbide, the majority of the grains having a spheroidal shape.

3. A plate as claimed in claim 2, wherein some of the tungsten carbide grains have a diameter of more than 0.5 mm.

4. A plate as claimed in claim 1, wherein the grains belong to two main families with two different grain sizes, a first family with a large grain size, and a second family with a small grain size, the two families being mixed uniformly in order to give a compact random distribution of tungsten carbide in the layer of hard material.

5. A plate as claimed in claim 1, wherein the tungsten carbide grains have a stable chemical composition containing roughly 4% carbon by weight and the cubic phase $WC(1-X)$ obtained by fast cooling and not destroyed or dissolved during the manufacture of the plate, with the grain hardness being higher than 3000 Vickers.

6. A grinding machine, wherein the said grinding machine includes at least one grinding plate as claimed in any of claim 1.

7. A plate as claimed in claim 2, wherein the grains belong to two main families with two different grain sizes, a first family with a large grain size, and a second family with a small grain size, the two families being mixed uniformly in order to give a compact random distribution of tungsten carbide in the layer of hard material.

8. A grinding plate with an abrasion-proof surface for grinding ceramic powders or for the defibration and refining of paper pulp, produced by a process comprising the steps of:
    a) preparing a cavity mold which has mold support walls having the same shape as the abrasion-proof surface of the grinding plate to be produced,
    b) introducing particles of melted tungsten carbide into the mold cavity and vibrating the mold so that the surface particles come into contact, as closely as possible, with the walls of the mold and are contiguous with each other,
    c) preparing a quantity of an alloy, the alloy being a soldering alloy capable of wetting the particles of tungsten carbide and melting at a temperature which is less than the melting point of the tungsten carbide and mold,
    d) beating the contents of the mold to a temperature which exceeds the melting point of the alloy but which is less than the melting points of the tungsten carbide and mold,
    e) maintaining the temperature of step (d) for a sufficient time to insure infiltration of the molten alloy into the space filled with the particles of tungsten carbide, and
    f) cooling the contents of the mold to ambient temperature and removing the mold.

* * * * *

UNITED STATES PATENT AND TRADEMARK OFFICE
CERTIFICATE OF CORRECTION

PATENT NO. : 5,201,917
DATED : April 13, 1993
INVENTOR(S) : Pierre Brunet and Guy Maybon It is certified that error appears in the above-identified patent and that said Letters Patent is hereby corrected as shown below:

In column 8, line 52, "beating" should be "heating".

Signed and Sealed this

Fourth Day of January, 1994

*Attest:*

BRUCE LEHMAN

*Attesting Officer*     Commissioner of Patents and Trademarks